United States Patent
Saraidaridis et al.

(10) Patent No.: US 11,923,583 B2
(45) Date of Patent: Mar. 5, 2024

(54) CONDENSATION-BASED REDOX FLOW BATTERY REBALANCING

(71) Applicant: Raytheon Technologies Corporation, Farmington, CT (US)

(72) Inventors: James D. Saraidaridis, Hartford, CT (US); Zhiwei Yang, South Windsor, CT (US)

(73) Assignee: RTX CORPORATION, Waltham, MA (US)

(*) Notice: Subject to any disclaimer, the term of this patent is extended or adjusted under 35 U.S.C. 154(b) by 0 days.

(21) Appl. No.: 17/521,238

(22) Filed: Nov. 8, 2021

(65) Prior Publication Data
US 2023/0144710 A1   May 11, 2023

(51) Int. Cl.
*H01M 8/18* (2006.01)
*H01M 8/04119* (2016.01)
*H01M 8/04186* (2016.01)

(52) U.S. Cl.
CPC ....... *H01M 8/188* (2013.01); *H01M 8/04186* (2013.01); *H01M 8/04164* (2013.01)

(58) Field of Classification Search
None
See application file for complete search history.

(56) References Cited

U.S. PATENT DOCUMENTS 10,461,352 B2   10/2019   Loretz et al.
2015/0162633 A1*  6/2015   Trudeau, Jr. ............ H01M 8/20
                                                                          429/409
2018/0219241 A1   8/2018   Chen et al.
2018/0316033 A1* 11/2018   Evans ................ H01M 8/04186
2021/0143455 A1*  5/2021   Song ................. H01M 8/04276

FOREIGN PATENT DOCUMENTS

WO    2017023068    2/2017

OTHER PUBLICATIONS

International Search Report and Written Opinion for International Application No. PCT/US2022/048652 dated Feb. 28, 2023.
Noack, J., Roznyatovskaya, N., Herr, T., and Fischer, P. (2015). The chemistry of redox-flow batteries. Angewandte Chemie International Edition. vol. 54(34). Jun. 26, 2015. pp. 9776-9809.
Faccinetti, I. (2020). Thermally regenerable redox flow battery. Chemsuschem. vol. 13(20). Sep. 9, 2020. pp. 5460-5467.

* cited by examiner

*Primary Examiner* — Haroon S. Sheikh
(74) *Attorney, Agent, or Firm* — Carlson, Gaskey & Olds, P.C.

(57) ABSTRACT

In a redox flow battery (RFB), the base solvent of the electrolytes tends to migrate across the barrier layer from one electrode toward the other. This can result in a volume and concentration imbalance between the electrolytes that is detrimental to battery efficiency and capacity. Compatible electrolytes can be mixed to rebalance the system, but for incompatible electrolytes mixing is not a viable option. To this end, the RFB herein includes a separator that recovers base solvent from the vapor phase of one of the electrolytes and returns the recovered base solvent to the other electrolyte to thereby reverse the imbalance.

18 Claims, 3 Drawing Sheets

CONDENSATION-BASED REDOX FLOW BATTERY REBALANCING

GOVERNMENT RIGHTS

This disclosure was made with Government support under Contract No. DE-AR0000994 awarded by the Department of Energy. The Government has certain rights in the disclosure.

BACKGROUND

Flow batteries, also known as redox flow batteries or redox flow cells, are designed to convert electrical energy into chemical energy that can be stored and later released back as electrical energy when there is demand As an example, a flow battery may be used with a renewable energy system, such as a wind-powered system, to store energy that exceeds consumer demand and later release that energy when there is greater demand A typical flow battery includes a redox flow cell that has a negative electrode and a positive electrode separated by an electrolyte layer, which may include a separator, such as an ion-exchange membrane. A negative fluid electrolyte (sometimes referred to as the anolyte or negolyte) is delivered to the negative electrode and a positive fluid electrolyte (sometimes referred to as the catholyte or posolyte) is delivered to the positive electrode to drive reversible redox reactions between redox pairs. Upon charging, the electrical energy supplied causes a reduction reaction in one electrolyte and an oxidation reaction in the other electrolyte. The separator prevents the electrolytes from freely and rapidly mixing but selectively permits ions to pass through to complete the redox reactions. Upon discharge, the chemical energy contained in the liquid electrolytes is released in the reverse reactions and electrical energy is drawn from the electrodes.

SUMMARY

A redox flow battery according to an example of the present disclosure includes a redox flow cell, a supply and storage system external of the redox flow cell, and a separator. The redox flow cell has a barrier layer arranged between first and second electrodes. The supply and storage system includes first and second vessels, first and second liquid electrolyte solutions in, respectively, the first and second vessels, fluid lines connecting the first and second vessels to, respectively, the first and second electrodes, and a plurality of pumps operable to circulate the first and second liquid electrolyte solutions via the fluid lines through the redox flow cell and the first and second vessels. The first and second electrolyte solutions include a base solvent that has a tendency to migrate across the barrier layer from the second electrode toward the first electrode and thereby cause an imbalance such that the second electrolyte solution increases in concentration and the first electrolyte solution decreases in concentration. The first electrolyte solution emanates a vapor phase containing the base solvent. The separator is in fluid connection with the first vessel to receive the vapor phase. The separator is operable to condense the base solvent from the vapor phase to produce recovered base solvent and return the recovered base solvent to the second electrolyte solution to thereby reverse the imbalance such that the concentration of the second electrolyte solution decreases and the concentration of the first electrolyte solution increases.

In a further example of the foregoing embodiment, the separator includes a heat exchanger condenser.

A further example of any of the foregoing embodiments further includes an evaporator that is operable to evaporate the base solvent from the first electrolyte solution to produce the vapor phase.

A further example of any of the foregoing embodiments further includes a feed line into the evaporator, and the feed line has an inlet located in a headspace of the first vessel above the first electrolyte solution.

A further example of any of the foregoing embodiments further includes a feed line into the evaporator, and the feed line has an inlet located below a headspace of the first vessel and submersed in the first electrolyte solution.

In a further example of any of the foregoing embodiments, the evaporator is outside of the first vessel.

In a further example of any of the foregoing embodiments, the separator includes a diffuser.

In a further example of any of the foregoing embodiments, the separator includes a gas phase return line connected to the first vessel.

In a further example of any of the foregoing embodiments, the gas phase return line includes an outlet that is submersed in the first electrolyte solution.

In a further example of any of the foregoing embodiments, the first and second electrolyte solutions are incompatible with each other in that, if mixed, they react to produce precipitate or react to become electrochemically inert.

In a further example of any of the foregoing embodiments, the separator is activated responsive to at least one of i) the concentration of the second electrolyte solution exceeding a preset concentration upper threshold, ii) the concentration of the first electrolyte solution falling below a preset concentration lower threshold, iii) the volume of the second electrolyte solution falling below a preset volume lower threshold, or iv) the volume of the first electrolyte solution exceeding a preset volume upper threshold.

A method for rebalancing a redox flow battery according to an example of the present disclosure includes providing a flow battery as in any of the foregoing examples, condensing a base solvent from the vapor phase of the first electrolyte solution to produce recovered base solvent, and returning the recovered base solvent to the second electrolyte solution to thereby cause a concentration rebalance in the first and second electrolyte solutions.

In a further example of any of the foregoing embodiments, the condensing is conducted via heat exchange with the vapor phase.

A further example of any of the foregoing embodiments further includes evaporating the base solvent from the first electrolyte solution into the vapor phase using an evaporator.

In a further example of any of the foregoing embodiments, the condensing is conducted via pressure increase of the vapor phase.

In a further example of any of the foregoing embodiments, the condensing produces a recovered gas phase, and returning the recovered gas phase to the first vessel.

In a further example of any of the foregoing embodiments, the returning of the recovered gas phase to the first electrolyte solution includes bubbling the recovered gas phase through the first electrolyte solution.

In a further example of any of the foregoing embodiments, the condensing is activated responsive to at least one of i) the concentration of the second electrolyte solution exceeding a preset concentration upper threshold, ii) the concentration of the first electrolyte solution falling below a preset concentration lower threshold, iii) the volume of the second electrolyte solution falling below a preset volume lower threshold, or iv) the volume of the first electrolyte solution exceeding a preset volume upper threshold.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
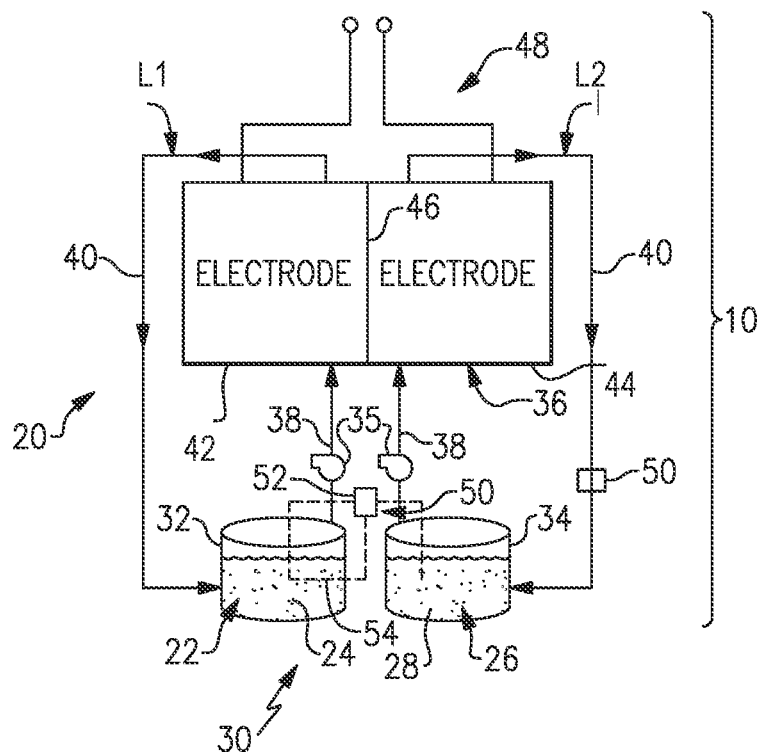
FIG. 1 illustrates a redox flow battery.

FIG. 1 schematically shows portions of an example system 10 that includes a redox flow battery 20 ("RFB 20") for selectively storing and discharging electrical energy. As an example, the RFB 20 can be used to convert electrical energy to chemical energy. At a later time, the RFB 20 can be used to convert the chemical energy back into electrical energy that may be provided to an electric grid, for example. The RFB 20 thus provides for electrical energy storage.

The RFB 20 includes a first electrolyte solution 22 that has at least one electrochemically active species 24 that functions in a redox pair with regard to a second electrolyte solution 26 that has at least one electrochemically active species 28. As will be appreciated, the terminology "first" and "second" is to differentiate that there are two distinct electrolytes. It is to be further understood that terms "first" and "second" as used herein are interchangeable in that a "first" could alternatively be termed a "second," and vice versa.

The electrochemically active species 24/28 include ions that have multiple, reversible oxidation states in a selected base solvent, such as but not limited to, water, acetonitrile, dimethoxyethane, and propylene carbonate. In some examples, the multiple oxidation states are non-zero oxidation states, such as transition metals including but not limited to vanadium, iron, manganese, chromium, zinc, molybdenum, sulfur, cerium, lead, tin, titanium, germanium, and functional combinations thereof. In some cases, the transition metals can be modified by bound chelating agents, including but not limited to ethylendiaminetetraacetic acid (EDTA) or other aminopolycarboxylic acids, acetylacetonates, bipyridyls, and phenanthrenes. In some examples, the multiple oxidation states can include the zero oxidation state if the element is readily soluble in the selected liquid solution in the zero oxidation state. Such elements can include the halogens, such as bromine, chlorine, and combinations thereof. The electrochemically active species 24/28 could also be organic molecules or macromolecules that contain groups that undergo electrochemically reversible reactions, such as quinones or nitrogen-containing organics, such as quinoxalines or pyrazines. The electrolytes 22/26 are solutions that include one or more of the electrochemically active species 24/28. The first electrolyte solution 22 and the second electrolyte solution 26 are contained in a supply/storage system 30 that includes first and second vessels 32/34.

The electrolyte solutions 22/26 are circulated by pumps 35 to at least one redox flow cell 36 of the RFB 20 through respective feed lines 38, and are returned from the cell 36 to the vessels 32/34 via respective return lines 40. As can be appreciated, additional pumps 35 can be used if needed, as well as valves (not shown) at the inlets/outlets of the components of the RFB 20 to control flow. In this example, the feed lines 38 and the return lines 40 connect the vessels 32/34 in respective loops L1/L2 with first and second electrodes 42/44. Multiple cells 36 can be provided as a stack within the loops L1/L2.

The cell or cells 36 each include the first electrode 42, the second electrode 44 spaced apart from the first electrode 42, and a barrier layer 46 arranged between the first electrode 42 and the second electrode 44. For example, the electrodes 42/44 may be porous electrically-conductive structures, such as carbon paper or felt. The electrodes 42/44 may also contain additional materials which are catalytically-active, for example a metal or metal oxide. In general, the cell or cells 36 can include bipolar plates, manifolds and the like for delivering the electrolytes 22/26 through flow field channels to the electrodes 42/44. It is to be understood, however, that other configurations can be used. For example, the cell or cells 36 can alternatively be configured for flow-through operation where the electrolyte solutions 22/26 are pumped directly into the electrodes 42/44 without the use of flow field channels.

The barrier layer 46 can be, but is not limited to, an ionic-exchange membrane, a micro-porous polymer membrane, or an electrically insulating microporous matrix of a material, such as silicon carbide (SiC), that prevents the electrolyte solutions 22/26 from freely and rapidly mixing but permits selected ions to pass through to complete the redox reactions while electrically isolating the electrodes 42/44. In this regard, the loops L1/L2 are isolated from each other during normal operation, such as charge, discharge and shutdown states.

The electrolyte solutions 22/26 may be delivered to, and circulate through, the cell or cells 36 during an active charge mode and discharge mode to either convert electrical energy into chemical energy or, in the reverse reaction, convert chemical energy into electrical energy that is discharged. The electrical energy is transmitted to and from the cell or cells 36 through an electric circuit 48 that is electrically coupled with the electrodes 42/44.

The base solvent of the electrolytes 22/26 has a tendency to migrate across the barrier layer 46, such as by diffusion. For example, differences in concentrations of the species 24/28 in the electrolyte solutions 22/26, differences in ionic strengths of the species 24/28, electro-osmotic drag of the base solvent across barrier layer 46 with charge carriers during charge and discharge, or combinations of these phenomena can drive diffusion. The result is that over time there can be a net gain of the base solvent in one of the electrolyte solutions 22/26 and a net loss of the base solvent in the other of the electrolyte solutions 22/26, which ultimately reduces efficiency and limits the electrical storage capacity of the RFB 20. In systems where the electrolyte solutions are compatible, such as an all vanadium system, some of the electrolyte solution that gained solvent can be transferred back into, and mixed with, the electrolyte solution that lost solvent in order to rebalance the electrolyte volumes and concentrations. However, in systems where the electrolyte solutions are incompatible (but use the same base solvent), such as systems with species that react to form precipitates or inert reaction products (e.g., sulfur/manganese), mixing the electrolytes is not an option. In this regard, as will be discussed in further detail below, the RFB 20 includes a rebalancing system 50, having a separator 52 and a feed line 54. Rebalancing system 50 is operable to rebalance the electrolyte solutions 22/26 without mixing them together. While such a rebalancing system 50 is expected to be most beneficial for systems that utilize incompatible electrolyte solutions, the examples herein could also be applied to systems that utilize compatible electrolytes.

Figure 2:
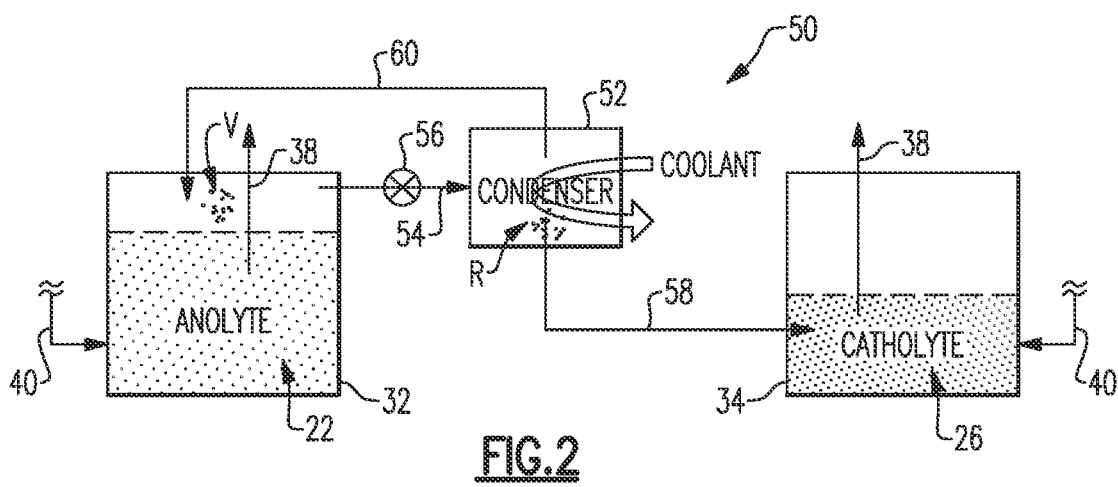
FIG. 2 illustrates a rebalancing system of the redox flow battery.

An example of the rebalancing system 50 is represented in FIG. 2. The examples herein are based on diffusion that tends to causes a net gain of the base solvent in the first electrolyte solution 22 and a net loss of the base solvent in the second electrolyte solution 26. It is to be understood, however, that the examples are equally applicable for the inverse scenario, in which the diffusion tends to causes a net gain of the base solvent in the second electrolyte solution 26 and a net loss of the base solvent in the first electrolyte solution 22. As those of ordinary skill in the art will be aware of, the "direction" in which there is a net gain or loss of the base solvent will depend on the configuration and operating parameters of the particular RFB and can be readily determined via experimentation and/or operation of the RFB.

The second electrolyte solution 26 emanates a vapor phase (V) that contains the base solvent (e.g., a "wet" gas). For example, the RFB 20 generates heat during operation. This heat tends to cause evaporation of some of the base solvent from the electrolyte solutions 22/26, thereby naturally producing the vapor phase (V) with RFB operation. The rebalancing system 50 includes a separator 52 that is in fluid connection with the first vessel 32, to collect the vapor phase (V). For instance, the vapor phase (V) tends to collect in the headspace in the vessel 32 above the liquid level of the first electrolyte solution 22, and there is a feed line 54 that has an inlet at the headspace and that leads into the separator 52. A fan, a pump, or other mover 56 may be provided in the feed line 54 in order to transfer the vapor phase (V) from the vessel 32 into the separator 52 that is outside of the vessel 32. Alternatively, for a more compact system, the separator 52 may be located inside of the vessel 32.

In the illustrated example, the separator 52 is a heat exchanger condenser. The condenser is operable to receive a working fluid (coolant) to reduce the temperature of the vapor phase (V) that is circulated through it. The base solvent condenses to produce recovered base solvent (R) that is relatively pure. The type of condenser is not particularly limited, as long as the vapor phase (V) can be circulated through it and the condensed base solvent can be collected. The recovered base solvent (R) is then returned to the second electrolyte solution 26, such as via a return line 58 to the vessel 34. The remaining "dry" gas phase after the base solvent is condensed is returned via gas phase return line 60 to the first vessel 32.

Figure 3:
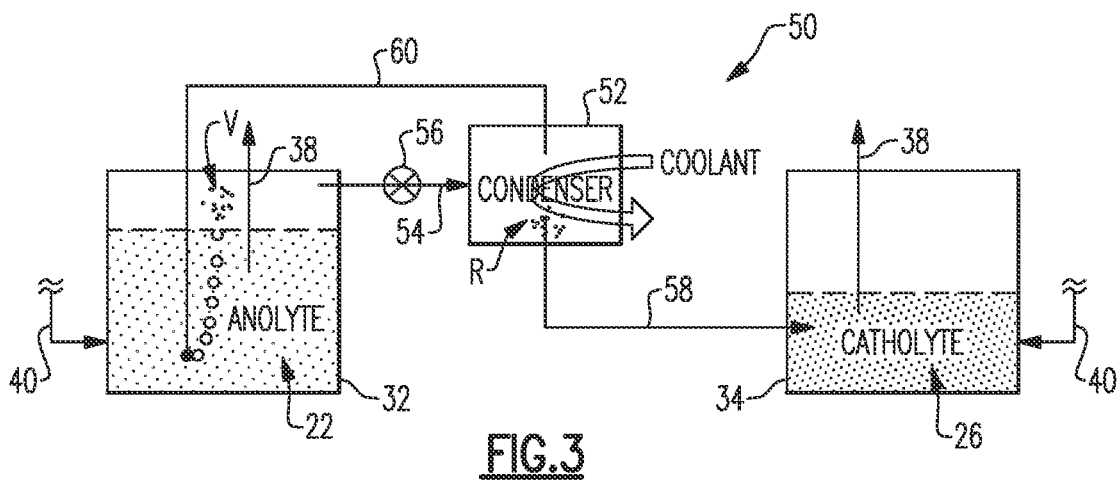
FIG. 3 illustrates a further example of the rebalancing system of FIG. 2.

In the illustrated example, the outlet of the gas phase return line 60 is in the headspace above the first electrolyte solution 22. Alternatively, as shown in FIG. 3, the outlet of the gas phase return line 60 is submersed in the first electrolyte solution 22 such that the dry gas phase is bubbled through the first electrolyte solution 22. To ensure submersion, the outlet is placed at a level that is substantially below the expected minimum level of the first electrolyte solution 22 in the vessel 32. The bubbling enhances capture of base solvent vapor from the first electrolyte solution 22. For increased bubbling, the outlet may include a porous element, such as a porous frit. The pores of the porous element divide the gas bubbles into smaller bubbles, which increases surface area for evaporation.

The return of the recovered base solvent (R) to the second electrolyte solution 26 reverses the imbalance such that the concentration of the second electrolyte solution 26 decreases and the concentration of the first electrolyte solution 22 increases. The condensing and returning can be conducted continuously in coordination with a known or estimated diffusion rate of the base solvent across the barrier layer 46 in order to maintain a balance within a desired margin, or conducted selectively as needed when it falls outside of a desired margin. For instance, the separator 52 is activated (to condense and return) responsive to at least one of i) the concentration of the second electrolyte solution 26 exceeding a preset concentration upper threshold, ii) the concentration of the first electrolyte solution 22 falling below a preset concentration lower threshold, iii) the volume of the second electrolyte solution 26 falling below a preset volume lower threshold, or iv) the volume of the first electrolyte solution 22 exceeding a preset volume upper threshold. Concentrations can be determined using known equipment and techniques, such as but not limited to, spectroscopy or wet electrochemistry. Volumes can be determined from fill levels or fill gauges of the vessels 32/34. In these regards, the RFB 20 may incorporate an electronic controller that is configured (via software, hardware, or both) to operate at least the separator 52 in accordance with the above control strategy. Such an electronic controller may be connected to concentration measurement equipment, fill level measurement equipment, the pumps 35, valves, or other components in the RFB 20 to control operation and provide feedback.

Figure 4:
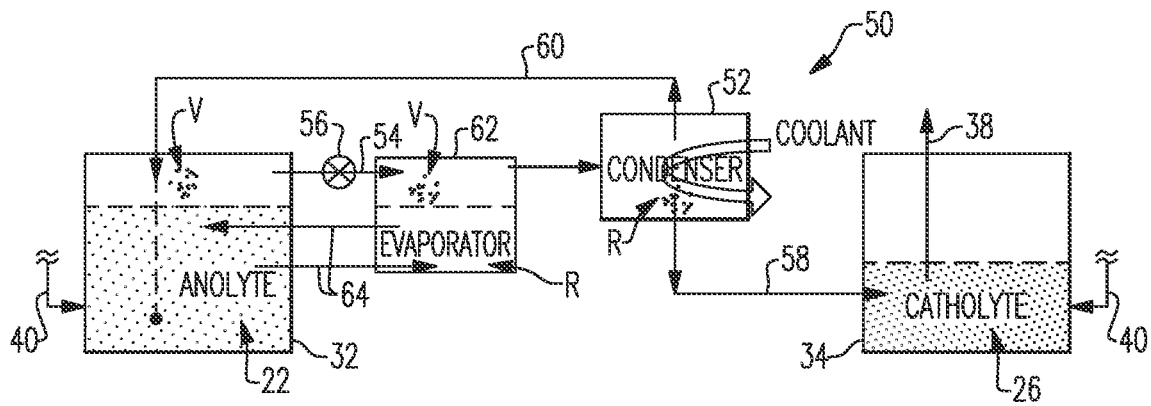
FIG. 4 illustrates a rebalancing system that additionally has an evaporator.

FIG. 4 illustrates a further example in which the rebalancing system 50 is the same as in FIG. 3 except that there is an evaporator 62 in the feed line 54 outside of the vessel 32. The evaporator 62 is operable to enhance evaporation (versus natural evaporation as in the example of FIG. 3) of the first electrolyte solution 22 to produce the vapor phase (V). For instance, the gas from the headspace of the vessel 32 may already carry some vapor phase (V) of the base solvent due to natural evaporation from the heat generated by operation of the RFB 20. The first electrolyte solution 22 is circulated via circulation lines 64 through the evaporator 62. The evaporator 62 may include a porous element that increases liquid/gas interface surface area for the gas to capture additional vapor phase. In a further example, the evaporator 62 may also include a heater that may be used to counteract evaporative cooling. The resulting vapor phase (V) is then fed from the evaporator 62 into the separator 52 (condenser) to recover the base solvent, as discussed above. By capturing additional base solvent, a relatively higher amount of base solvent can be recovered for return to the second electrolyte 26. As for the separator 52, the evaporator 62 may be located inside of the vessel 32 for a more compact system.

Figure 5:
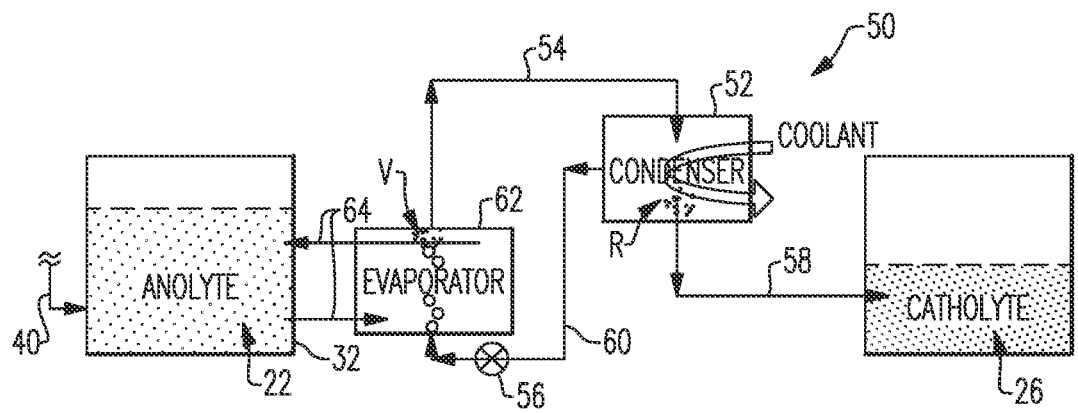
FIG. 5 illustrates another rebalancing system that has an evaporator.

In another configuration illustrated in FIG. 5, the rebalancing system includes supplemental heating of the first electrolyte solution 22 (in addition to natural heating) to generate the vapor phase (V). In this example, instead of the inlet of the feed line 54 being located in the headspace of the vessel 32, the inlet of the feed line 54 is below the headspace and submersed in the first electrolyte solution 22 in order to feed the first electrolyte solution 22 to the evaporator 62. The first electrolyte solution 22 is circulated through the evaporator 62 via lines 64. The evaporator 62 provides supplemental heat to the first electrolyte solution 22, causing evaporation of some of the base solvent to produce the vapor phase (V). The vapor phase (V) is then fed to the condenser 52 via feed line 54 to recover the base solvent, as discussed above, and return it via return line 58 to the second electrolyte solution 26. The dry gas phase after the base solvent is condensed is returned via gas phase return line 60 to the evaporator 62 and bubbled through the first electrolyte solution 22 therein to enhances capture of base solvent vapor. Alternatively, for a more compact system, the evaporator 62 may be located inside of the vessel 32.

Figure 6:
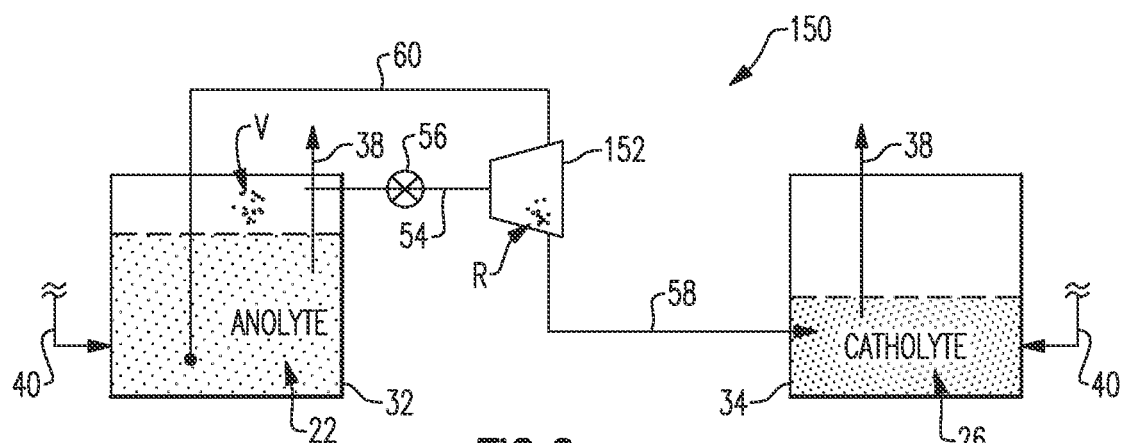
FIG. 6 illustrates a rebalancing system that includes a diffuser.

In the examples above, the rebalancing system 50 is temperature-driven, i.e., reduce temperature to drive condensation. In the rebalancing system 150 in following example of FIG. 6, however, the recovery of the base solvent is pressure-driven, i.e., increase pressure to drive condensation. In this regard, in the rebalancing system 150 the separator 152 is a diffuser instead of a condenser as in the prior examples. The vapor phase (V) gas from the headspace of the vessel 32 is provided into the diffuser. The diffuser provides an increase in volume for the gas flow, which has the effect of reducing the flow velocity. The velocity-decrease causes an increase in pressure that results in condensation of the base solvent. As in the prior examples, the recovered base solvent (R) is then fed back into the second electrolyte solution 26 via return line 58 for rebalancing. In additional examples, the condenser in each of the examples of FIGS. 2-5 is replaced with the diffuser. Use of the diffuser eliminates the need for a coolant that would be used in the condenser.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A redox flow battery comprising:
   a redox flow cell including a barrier layer arranged between first and second electrodes;
   a supply and storage system external of the redox flow cell, the supply and storage system including first and second vessels, first and second liquid electrolyte solutions in, respectively, the first and second vessels, fluid lines connecting the first and second vessels to, respectively, the first and second electrodes, and a plurality of pumps operable to circulate the first and second liquid electrolyte solutions via the fluid lines through the redox flow cell and the first and second vessels,
   the first and second electrolyte solutions including a base solvent that has a tendency to migrate across the barrier layer from the second electrode toward the first electrode and thereby cause an imbalance such that the second electrolyte solution increases in concentration and the first electrolyte solution decreases in concentration, the first electrolyte solution emanating a vapor phase containing the base solvent; and
   a separator in fluid connection with the first vessel to receive the vapor phase, the separator operable to condense the base solvent from the vapor phase to produce recovered base solvent and return the recovered base solvent to the second electrolyte solution to thereby reverse the imbalance such that the concentration of the second electrolyte solution decreases and the concentration of the first electrolyte solution increases.

2. The redox flow battery as recited in claim 1, wherein the separator includes a heat exchanger condenser.

3. The redox flow battery as recited in claim 2, further comprising an evaporator operable to evaporate the base solvent from the first electrolyte solution to produce the vapor phase.

4. The redox flow battery as recited in claim 3, further comprising a feed line into the evaporator, the feed line having an inlet located in a headspace of the first vessel above the first electrolyte solution.

5. The redox flow battery as recited in claim 3, further comprising a feed line into the evaporator, the feed line having an inlet located below a headspace of the first vessel and submersed in the first electrolyte solution.

6. The redox flow battery as recited in claim 3, wherein the evaporator is outside of the first vessel.

7. The redox flow battery as recited in claim 1, wherein the separator includes a diffuser.

8. The redox flow battery as recited in claim 1, wherein the separator includes a gas phase return line connected to the first vessel.

9. The redox flow battery as recited in claim 8, wherein the gas phase return line includes an outlet that is submersed in the first electrolyte solution.

10. The redox flow battery as recited in claim 1, wherein the first and second electrolyte solutions are incompatible with each other in that, if mixed, they react to produce precipitate or react to become electrochemically inert.

11. The redox flow battery as recited in claim 1, wherein the separator is activated responsive to at least one of i) the concentration of the second electrolyte solution exceeding a preset concentration upper threshold, ii) the concentration of the first electrolyte solution falling below a preset concentration lower threshold, iii) the volume of the second electrolyte solution falling below a preset volume lower threshold, or iv) the volume of the first electrolyte solution exceeding a preset volume upper threshold.

12. A method for rebalancing a redox flow battery, the method comprising:
   providing a flow battery that has a redox flow cell that includes a barrier layer arranged between a first electrode and a second electrodes; a supply and storage system external of the redox flow cell, the supply and storage system including a first vessel and a second vessel, having a first electrolyte solution and a second electrolyte solution in, respectively, the first and second vessels, fluid lines that connect the first and second vessels to, respectively, the first and second electrodes, and a plurality of pumps operable to circulate the first and second electrolyte solutions via the fluid lines through the redox flow cell and the first and second vessels, the first and second electrolyte solutions include a base solvent that has a tendency to migrate across the barrier layer from the second electrode toward the first electrode causing a concentration imbalance in the first and second electrolyte solutions; and
   condensing a base solvent from a vapor phase of the first electrolyte solution to produce recovered base solvent, and returning the recovered base solvent to the second electrolyte solution to thereby cause a concentration rebalance in the first and second electrolyte solutions.

13. The method as recited in claim 12, wherein the condensing is conducted via heat exchange with the vapor phase.

14. The method as recited in claim 13, further comprising evaporating the base solvent from the first electrolyte solution into the vapor phase using an evaporator.

15. The method as recited in claim 12, wherein the condensing is conducted via pressure increase of the vapor phase.

16. The method as recited in claim 12, wherein the condensing produces a recovered gas phase, and returning the recovered gas phase to the first vessel.

17. The method as recited in claim 16, wherein the returning of the recovered gas phase to the first electrolyte solution includes bubbling the recovered gas phase through the first electrolyte solution.

18. The method as recited in claim 12, wherein the condensing is activated responsive to at least one of i) the concentration of the second electrolyte solution exceeding a preset concentration upper threshold, ii) the concentration of the first electrolyte solution falling below a preset concentration lower threshold, iii) the volume of the second electrolyte solution falling below a preset volume lower threshold, or iv) the volume of the first electrolyte solution exceeding a preset volume upper threshold.

\* \* \* \* \*